US011513074B2

(12) United States Patent
Shalabney et al.

(10) Patent No.: US 11,513,074 B2
(45) Date of Patent: Nov. 29, 2022

(54) METHOD AND DEVICE FOR DETECTING EXTRACELLULAR VESICLES

(71) Applicant: OFEK—ESHKOLOT RESEARCH AND DEVELOPMENT LTD, Karmiel (IL)

(72) Inventors: Atef Shalabney, Iksal (IL); Marei Sammar, Tamra (IL); Said Mahajna, Umm El Fahem (IL)

(73) Assignee: OFEK—ESHKOLOT RESEARCH AND DEVELOPMENT LTD.

( * ) Notice: Subject to any disclaimer, the term of this patent is extended or adjusted under 35 U.S.C. 154(b) by 21 days.

(21) Appl. No.: 17/257,451

(22) PCT Filed: Jul. 11, 2019

(86) PCT No.: PCT/IL2019/050778
§ 371 (c)(1),
(2) Date: Dec. 31, 2020

(87) PCT Pub. No.: WO2020/012482
PCT Pub. Date: Jan. 16, 2020

(65) Prior Publication Data
US 2021/0293703 A1 Sep. 23, 2021

Related U.S. Application Data

(60) Provisional application No. 62/696,391, filed on Jul. 11, 2018.

(51) Int. Cl.
*G01N 21/552* (2014.01)
(52) U.S. Cl.
CPC .................. *G01N 21/553* (2013.01)
(58) Field of Classification Search
CPC .. G01N 21/553; G01N 21/554; G01N 21/648; G02B 6/1226

(Continued)

(56) References Cited

U.S. PATENT DOCUMENTS

| 4,997,278 A | 3/1991 | Finlan |
| 5,313,264 A | 5/1994 | Ivarsson et al. |

(Continued)

FOREIGN PATENT DOCUMENTS

| CN | 105974122 B | 9/2018 |
| KR | 10 2015 0139096 | 12/2015 |

(Continued)

OTHER PUBLICATIONS

Shalabney and I Abdulhalim A: "Figure-of-merit enhancement of surface plasmon resonance sensors in the spectral interrogation", Optics Letters, Optical Society of America, US, vol. 37, No. 7, Apr. 1, 2012 (Apr. 1, 2012), pp. 1175-1177, XP00157460.

(Continued)

*Primary Examiner* — Sunghee Y Gray
(74) *Attorney, Agent, or Firm* — Clark Hill PLC; James R. Foley

(57) ABSTRACT

Detection system for detecting at least one extracellular vesicle in a microfluid, including a broadband light source, collimating and focusing optics, a spectrophotometer, a microfluid apparatus and an active sensing element positioned inside the microfluid apparatus, the active sensing element including a substrate, a thin metal layer deposited on the substrate and a dielectric waveguide layer deposited on the metal layer, the light source generating at least one incident beam of light in the near infrared region, the metal layer and the waveguide layer each include a plurality of waveguides, the collimating optics collimates the incident beam of light on the substrate via the coupler, the focusing optics receives at least one reflection of the incident beam of light and provides the reflection to the spectrophotometer, the active sensing element causes surface plasmon waves in the microfluid when the microfluid is injected into the microfluid apparatus and the spectrophotometer detects (Continued)

resonance wavelength shifts in the reflection according to the surface plasmon waves thereby detecting the presence of the extracellular vesicle in the microfluid.

4 Claims, 5 Drawing Sheets

(58) Field of Classification Search
USPC ......................................................... 356/445
See application file for complete search history.

(56) References Cited

U.S. PATENT DOCUMENTS

| 5,485,277 | A | 1/1996 | Foster | |
| 8,564,781 | B2* | 10/2013 | Miyadera | G01N 21/553 |
| | | | | 356/445 |
| 2003/0206708 | A1* | 11/2003 | Estes | G02B 6/1226 |
| | | | | 385/37 |
| 2007/0153284 | A1 | 7/2007 | Glazier | |
| 2008/0198376 | A1 | 8/2008 | Poponin | |
| 2009/0097022 | A1 | 4/2009 | Shen | |
| 2009/0321661 | A1* | 12/2009 | Ohtsuka | G01N 21/05 |
| | | | | 250/576 |
| 2011/0037981 | A1* | 2/2011 | Zhu | G01N 21/553 |
| | | | | 257/E31.127 |
| 2011/0188043 | A1 | 8/2011 | Davidov et al. | |
| 2012/0208174 | A1 | 8/2012 | Galush et al. | |
| 2014/0268168 | A1 | 9/2014 | Feldman | |
| 2016/0178516 | A1* | 6/2016 | Abdulhalim | G01N 29/022 |
| | | | | 977/954 |
| 2016/0334398 | A1 | 11/2016 | Weissleder | |
| 2017/0328904 | A1 | 11/2017 | Lee | |
| 2018/0003619 | A1 | 1/2018 | Sieben et al. | |

FOREIGN PATENT DOCUMENTS

| WO | 2015019341 A1 | 2/2015 |
| WO | 2017165800 A3 | 9/2017 |

OTHER PUBLICATIONS

Mahajna Said et al: "Plasmon-Waveguide Resonances with Enhanced Figure of Merit and Their potential for Anisotropic Biosensing in the Near Infrared Region",Journal of Sensors, [Online] vol. 2016, Jan. 1, 2016 (Jan. 1, 2016), pp. 1-6, XP055887380, US ISSN: 1687-725X, DOI: 10.1155/2016/1898315 Retrieved from the Internet: URL:http://downloads.hindawi.com/journals/js/2016/1898315.pdf> [retrieved on Feb. 3, 2022].

A. Shalabney et al: "Sensitivity-enhancement methods for surface plasmon sensors", Laser & Photonics Reviews, vol. 5, No. 4, Jul. 1, 2011 (Jul. 1, 2011), pp. 571-606, XP055006811, ISSN: 1863-8880, DOI: 10.1002/1por.201000009.

* cited by examiner

METHOD AND DEVICE FOR DETECTING EXTRACELLULAR VESICLES

This application is a National Phase Filing of PCT/IL2019/050778, having an International filing date of Jul. 11, 2019, which claims priority of U.S. Provisional Application Ser. No. 62/696,391, having a filing date of Jul. 11, 2018. The disclosure of the foregoing are hereby incorporated by reference.

FIELD OF THE DISCLOSED TECHNIQUE

The disclosed technique relates to biological detection, in general, and to methods and systems for detecting extracellular vesicles, in particular.

BACKGROUND OF THE DISCLOSED TECHNIQUE

Extracellular vesicles (herein abbreviated EVs), such as exosomes and small macrovesicles (herein abbreviated MVs), are nanometer-sized vesicles, naturally released from body cells in both normal and diseased states. Exosomes may range in size from 40-160 nanometers and are derivatives of the endosomal system. Small macrovesicles may range in size from 100-1000 nanometers and are produced by outward budding of the plasma membrane. Reflecting their body cells of origin, EVs are assembled by specific sets of molecules including proteins, lipids, metabolites and nucleic acids. EVs contain specific signatures of their cell-type of origins and have thus been proposed as biomarkers for a variety of diseases. According to their features, EVs are ideal candidates to serve as biomarkers, nanometer-sized drug-delivery vehicles and mediators for a variety of therapeutics in oncology, immune therapy and regenerative medicine. EVs thus have the potential for great clinical impact in nanomedicine. The dual potential of EVs as a diagnostic tool and also as a therapeutic agent makes them very promising in the emerging field of theranostics. Tumor-derived EVs are being proposed to contain a tumor-specific molecular signature qualifying them as potential biomarkers in tumor diagnostics. Such EVs can be harvested from biofluids such as blood and, for some cancer types, urine, saliva and amniotic fluid. As exosomes and microvesicles carry information about a parent tumor in most types of cancer, the ability to detect and recognize such EVs during the early-stages of cancer would be very beneficial to the medical profession. However given their relative size, EV detection and recognition require high accuracy and high sensitivity detection systems and methods. Capturing the information contained within EVs without a biopsy of the parent tumor could be a useful clinical and research tool.

Conventional methods of analyzing EVs generally require large quantities of a sample to be concentrated and processed via time-consuming techniques such as immunoblotting, enzyme-linked immunosorbent assays (herein abbreviated ELISA), ultracentrifugation and flow cytometry. Rapid isolation and analysis of exosomes is challenging, since ultracentrifugation is time consuming and other conventional detection methods require large sample amounts and extensive post-labeling processes for detection. Given these limitations, state-of-the-art analytical methods for detecting and analyzing EVs are impractical for experimental schemes and clinical settings that require large throughput or in which EV concentration in samples is low. These methods are thus impractical in most clinical settings. In many of the original studies of EVs, ultracentrifugation is used to isolate these vesicles, however ultracentrifugation can have a significant impact on the number, type, content and integrity of the vesicles isolated. EV isolation methods are known in the art, such as in the published article "Methods of isolating extracellular vesicles impact down-stream analyses of their cargoes" to D. D. Taylor and S. Shah, published in Methods, Oct. 1, 2015, no. 87 pp. 3-10. EV-based cancer screening can provide a huge potential in various applications, particularly in differentiating among cancer entities via using just a mere blood sample or other bodily fluid sample. A number of experimental studies have been carried out to detect cancer traces by tumor derived EVs including the detection of exosomes and/or microvesicles.

A number of complicated, time-consuming and non-scalable methods are known to detect cancer based on the identification of EVs in bodily fluids. In one system, nuclear magnetic resonance (herein abbreviated NMR) can be used to detect membrane-bound MVs from blood samples of glioblastoma patients. In this system, in order to achieve detection, the MVs are introduced onto a microfluidic chip and labeled with target-specific magnetic nanoparticles. According to another method, photosensitizers-beads-conjugated antibodies can be used for the detection of colorectal cancer using the antigen CD147 which is embedded in cancer-linked EVs. Plasmonic structures can also be used in tumor-derived EV detection. In these systems, a hole-array having a hole size of tens of microns can be used to analyze ascites samples from ovarian cancer patients. The hole diameter is around 200-300 nanometers and the period is approximately twice the diameter, namely 400-600 nanometers, with the entire hole-array having a size around tens of microns. In order to fabricate the hole-array, focused ion beam techniques are required. As the size of the hole-array increases, the preparation time required to use the hole-array to analyze samples also increases. In addition, an increase in hole-array size leads to a decrease in analysis precision of the holes because the electron beams used in such systems need to be focused on a larger area. In these systems, exosomes derived from ovarian cancer cells can be identified by their expression of CD24 and EpCAM, demonstrating the potential of exosomes for diagnostics. In each of these prior art systems and methods a relatively highly-concentrated sample of the required EVs for sensing is needed due to the limited sensitivity of these systems and methods. Thus these prior art techniques are both bulky and expensive. Additionally, even though plasmonic structures have been proposed for sensing EVs, such systems still lack the required sensitivity and penetration depth in order to differentiate between exosomes and macrovesicles. Moreover, using hole-arrays as a platform to excite plasmonic fields is rather sophisticated and requires high-level techniques for fabricating the hole-arrays. This can normally be achieved by techniques such as focused ion beam patterning or electron beam lithography.

As mentioned above, methods and systems for detecting exosomes are known in the art, for example as detailed in the published article "Label-free detection and molecular profiling of exosomes with a nano-plasmonic sensor" to H. Im et al., published in Nature Biotechnology, May 2014, vol. 32 no. 5 pp. 490-495. Other examples are disclosed in US patent application publication nos. US 2016/0334398 A1, US 2017/0328904 A1, US 2009/0097022 A1, US 2014/0268168 A1 and US 2008/0198376 A1. Further examples can be found in PCT international application publication no. WO 2017/165800 A2, Korean patent application publication no. KR 10-2015-0139096 and Chinese patent application publication no. CN 105974122 A.

SUMMARY OF THE DISCLOSED TECHNIQUE

It is an object of the disclosed technique to provide a novel system and method for detecting and recognizing extracellular vesicles, having an increased sensitivity and accuracy, which is cost effective to fabricate and also simple to use. In accordance with the disclosed technique there is thus provided a detection system for detecting at least one extracellular vesicle in a microfluid. The detection system includes a broadband light source, collimating optics, focusing optics, a coupler, a spectrophotometer, a microfluid apparatus and an active sensing element. The microfluid apparatus includes an inlet and an outlet. The active sensing element includes a substrate, a thin metal layer deposited on the substrate and a dielectric waveguide layer deposited on the thin metal layer. The thin metal layer and the dielectric waveguide layer each include a plurality of waveguides. The coupler is positioned between the collimating optics and the focusing optics and the active sensing element is positioned inside the microfluid apparatus. The broadband light source generates at least one incident beam of light in the near infrared region. The collimating optics collimates the incident beam of light on the substrate via the coupler and the focusing optics receives at least one reflection of the incident beam of light and provides the reflection to the spectrophotometer. The active sensing element causes surface plasmon waves in the microfluid when the microfluid is injected into the microfluid apparatus and the spectrophotometer detects resonance wavelength shifts in the reflection according to the surface plasmon waves thereby detecting the presence of the extracellular vesicle in the microfluid.

In accordance with another aspect of the disclosed technique there is thus provided a detection system for detecting at least one extracellular vesicle in a microfluid. The detection system includes a coherent light source, collimating optics, focusing optics, a coupler, an optical detector, a microfluid apparatus and an active sensing element. The microfluid apparatus includes an inlet and an outlet. The active sensing element includes a substrate, a thin metal layer deposited on the substrate and a dielectric waveguide layer deposited on the thin metal layer. The thin metal layer and the dielectric waveguide layer each include a plurality of waveguides. The coupler is positioned between the collimating optics and the focusing optics and the active sensing element is positioned inside the microfluid apparatus. The coherent light source generates at least one incident beam of light in the near infrared region. The collimating optics collimates the incident beam of light on the substrate via the coupler and the focusing optics receives at least one reflection of the incident beam of light and provides the reflection to the optical detector. The active sensing element causes surface plasmon waves in the microfluid when the microfluid is injected into the microfluid apparatus and the optical detector detects shifts in optical intensity in the reflection according to the surface plasmon waves thereby detecting the presence of the extracellular vesicle in the microfluid.

In accordance with a further aspect of the disclosed technique there is thus provided a method for detecting at least one extracellular vesicle in a microfluid using an active sensing element including a substrate, a thin metal layer deposited on the substrate and a dielectric waveguide layer deposited on the thin metal layer. The thin metal layer and the dielectric waveguide layer each include a plurality of waveguides. The method includes the procedures of making a microfluid cover mold from a polymer and cleaning the microfluid cover and the active sensing element. The method also includes the procedures of injecting the microfluid into the microfluid cover mold, positioning the microfluid cover mold over the active sensing element and illuminating through a coupler and the active sensing element the microfluid with at least one incident beam of light in the near infrared region using a broadband light source. The method further includes the procedures of receiving at least one reflection of the incident beam of light in a spectrophotometer and detecting resonance wavelength shifts in the reflection using the spectrophotometer. The active sensing element causes surface plasmon waves in the microfluid when the microfluid is illuminated by the incident beam of light and resonance wavelength shifts occur due to the surface plasmon waves, thereby enabling the detection of the presence of the extracellular vesicle in the microfluid.

In accordance with another aspect of the disclosed technique there is thus provided a method for preparing an active sensing element for use in a detection system for detecting at least one extracellular vesicle in a microfluid. The method includes the procedures of cleaning a glass substrate, depositing a thin metallic layer on the glass substrate, dissolving a polymer in an appropriate solvent to form a polymer solution to prepare a dielectric waveguide layer, applying the polymer solution to the top of the thin metallic layer and annealing the active sensing element, thereby chemically stabilizing the dielectric waveguide layer.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

Figure 1:
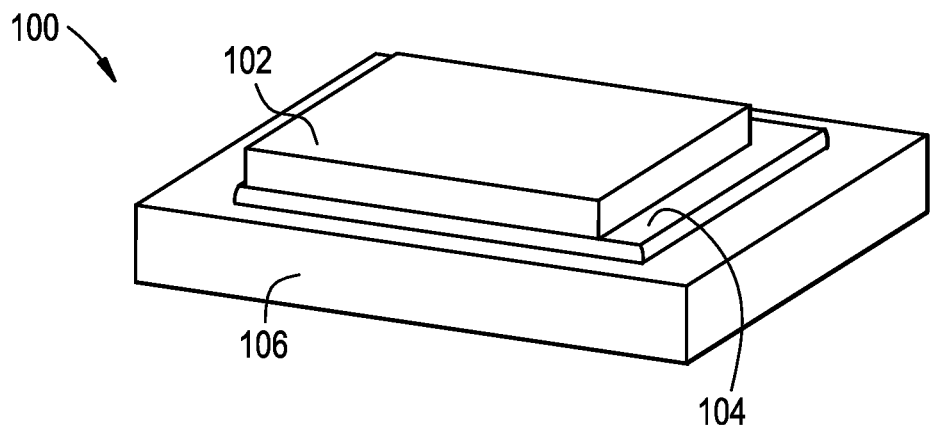
FIG. 1 is a schematic illustration of an active layer structure, constructed and operative in accordance with an embodiment of the disclosed technique.

The disclosed technique overcomes the disadvantages of the prior art by providing a novel system and method for detecting and recognizing EVs such as exosomes. The EV detector of the disclosed technique has an increased sensitivity and accuracy by at least one order of magnitude over the prior art, is cost effective to fabricate and also simple to use thus making it practical for clinical settings and experimental schemes. The disclosed technique thus presents a wide scale EV detector that can be used in settings requiring high throughput, wherein sample sizes might be small and wherein EV detection and recognition is simplified. According to the disclosed technique, cancer cells can be detected with high sensitivity and specificity that enables early-stage tumor recognition, the high sensing capability being possible with small EV sample amounts and diagnosis times being very short (on the range of minutes). The disclosed technique can be used to also detect autoimmune diseases and any other body state that has a specific exosome signature. As described below, the EV detector of the disclosed technique is simple to fabricate and easy to use thereby enabling practical clinical applications. One use of the disclosed technique is the detection of cancer biomarkers. According to the disclosed technique, a hybrid structure is implemented in which a plasmon-waveguide is excited which is coupled with optical modes having extremely high sensitivity in the near infrared (herein abbreviated NIR) region and the mid infrared (herein abbreviated MIR) region. Highly sensitive structures representing different types of EVs can be detected based on optical detection. The structures are based on probing the optical properties of an analyte (i.e., the medium to be sensed) when it is attached to the hybrid structures.

According to the disclosed technique, the ultra-high sensitivity of the detector enables the use of raw body fluids without purifications or further concentration of the EVs contained in the samples, which might be blood, urine, saliva, cerebrospinal fluid and/or amniotic fluid. Since optical measurements are used to detect the EV, detection times for the EV detector of the disclosed technique are extremely short (i.e., at most a matter of minutes). Furthermore, the disclosed technique uses broadband light sources which do not require powerful light sources that may deteriorate a measured EV sample or limit its use. Also according to the disclosed technique, target-specific EV binding can be used and thus different types of tumor cells can be probed simultaneously, thereby increasing the specificity of the EV detector and the possible throughput. Furthermore, the material costs and fabrication costs of the disclosed technique are low compared to the systems of the prior art, comprising homogeneous planar films made from metals and dielectrics, making it easy for fabrication, characterization and calibration, thus leading to an EV detector system and method which is cost effective.

According to the disclosed technique, a thin metallic surface is used as the base upon which an analyte containing an EV sample is placed and then excited via surface plasmon waves (herein abbreviated SPW) through a plasmon-waveguide structure. The structure of the disclosed technique thus enables biosensing. SPWs are collective oscillations of electrons on the surface of thin metallic films that can be efficiently excited by light in the visible to the MIR region. Unlike propagating electromagnetic (herein abbreviated EM) waves, SPWs are excited evanescently and exhibit high intensities on a metal-analyte interface. The high EM intensities inside the medium adjacent to the metal are extremely sensitive to their optical properties, making them a powerful tool for molecular sensing and detection. When SPWs are excited by light using either a high-refractive-index prism or a diffraction grating, surface plasmon resonance (herein abbreviated SPR) is obtained exhibiting distinct spectroscopic signatures that can be used for sensing and detection.

According to the disclosed technique, a multilayer system is engineered causing the dispersion of a plurality of optical modes and thereby significantly enhancing their sensitivity for molecular detection. The hybrid structure of the disclosed technique couples plasmonic layers with dielectric waveguides and provides optical modes in the NIR region. Transverse electric (herein abbreviated TE) and transverse magnetic (herein abbreviated TM) polarization states can be excited in the hybrid structure thereby enabling anisotropic sensing to be performed. The configuration of the disclosed technique enables:

(1) ultra-high sensitivity and figure-of-merit (FOM);
(2) large penetration depth in the NIR region; and
(3) capability for anisotropic sensing.

All these features are particularly essential when detecting tumor-derived EVs. The low concentrations of EVs typically retrieved from bodily fluids require extremely high sensitivity on the part of the detection element. A large penetration depth, on the other hand, is critical to differentiating between exosomes (tens of nanometers in size) and microvesicles (microns in size). The possibility of sensing the anisotropy of the target sample enables gaining deep insights into the structure and morphology of the analyte. As mentioned above, the disclosed technique is not limited to the detection of exosomes as biomarkers for the detection of cancer but can also be used to detect disease states in the body having a specific exosome signature.

Reference is now made to FIG. 1, which is a schematic illustration of an active layer structure, generally referenced 100, constructed and operative in accordance with an embodiment of the disclosed technique. Active layer structure 100 includes a substrate 106, a thin metallic layer 104 and a dielectric waveguide layer 102. Thin metallic layer 104 may be 15-50 nanometers in thickness whereas dielectric waveguide layer 102 may be 500-1500 nanometers in thickness. As shown, thin metallic layer 104 is sandwiched between dielectric waveguide layer 102 and substrate 106. Substrate 106 may be a glass substrate. Substrate 106 may have a high index of refraction. Thin metallic layer 104 may be made from silver. Active layer structure 100 is composed of a thin metallic film (which can be made from silver, gold or other metals) and a thick dielectric waveguide. The specific choice of material for the thin metallic film is a matter of design choice and system optimization and might depend on the type of analyte being probed on the active layer structure. All the layers as shown in FIG. 1 are deposited on top of substrate 106 which is compatible in the working spectral region. Thin metallic layer 104 and dielectric waveguide layer 102 may be prepared first as a double-layered structure which is then deposited on substrate 106 using known physical vapor deposition techniques. Dielectric waveguide layer 102 is made from a compatible polymer with thin metallic layer 104. For example, when thin metallic layer 104 is made from silver, dielectric waveguide layer 102 can be made from either silicon dioxide (herein abbreviated $SiO_2$) or a standard polymer such as poly(methyl methacrylate) (herein abbreviated PMMA). In one embodiment, the waveguides in dielectric waveguide layer 102 can be made from silica. In another embodiment, dielectric waveguide layer 102 is made from a polymer which is initially a powder. In this embodiment, the powder is dissolved, made into a gel and is then coated on thin metallic layer 104, finally being annealed onto the thin metallic layer. The deposition of the silver can be performed using standard thermal evaporation or sputtering techniques as is known in the art. Dielectric waveguide layer 102 can be sputtered if it's made from $SiO_2$ or can be spin coated and baked on if it's made from a polymer. The final thicknesses of the layers can be optimized according to the working spectral region and is a matter of design choice. Standard cleaning procedures may be used in the preparation of active layer structure 100.

An example of the preparation of active layer structure 100 according to the disclosed technique may be as follows. In a first step (1), a glass substrate is taken and is thoroughly cleaned using a precise cleaning procedure. In a second step (2), the thin metallic layer is deposited on the glass substrate either via sputtering or by a technique of thermal evaporation under high vacuum. In a third step (3), an appropriate polymer is dissolved in an appropriate solvent to prepare dielectric waveguide layer 102. For example, PMMA (a polymer) may be dissolved in toluene as a solvent. The thickness of the attainable waveguide layer can be adjusted by modifying the viscosity of the polymer solution. In a fourth step (4), the polymer solution is applied to the top of the thin metallic layer with its thickness being fine-tuned by a technique of spin coating. In a fifth step (5), the whole active layer structure is annealed in an oven with a temperature ranging from 100-120 degrees Celsius for about one hour, thereby making the dielectric waveguide layer chemically stable. It is noted that prior art techniques may fabricate the dielectric waveguide layer from $SiO_2$ which requires thermal evaporation of $SiO_2$ under ultra-high vacuum conditions. Such techniques are complicated and expensive as compared to the disclosed technique using a polymer.

Figure 2:
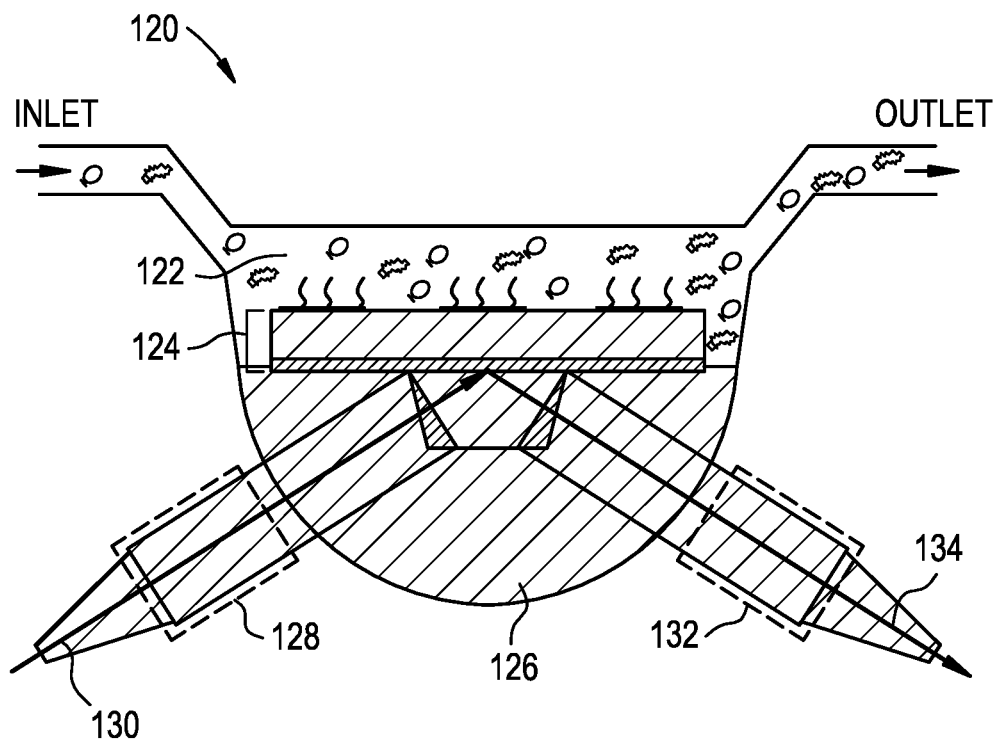
FIG. 2 is a schematic illustration of an EV detection system, constructed and operative in accordance with another embodiment of the disclosed technique.

Reference is now made to FIG. 2, which is a schematic illustration of an EV detection system, generally referenced 120, constructed and operative in accordance with another embodiment of the disclosed technique. EV detection system 120 includes collimating optics 128 and focusing optics 132, an active sensing layer 124, a prism coupler 126 and an inlet (not labeled) and an outlet (not labeled) for introducing a microfluid 122 comprising an analyte sample containing EVs. Microfluid 122 may be a bodily fluid such as blood, urine, saliva, cerebrospinal fluid and/or amniotic fluid, and including more than one type of exosome in which tumor-derived EVs are embedded. Prism coupler 126 may be a high index of refraction coupler. Prism coupler 126 can be embodied as a coupler or as a diffraction grating. It is noted that according to the disclosed technique, microfluid 122 does not require any complex processing and is injected into the inlet as a raw sample. Active sensing layer 124 is an embodiment of active layer structure 100 (FIG. 1) and includes a high index of refraction substrate, a thin metal layer and a dielectric waveguide layer (all not labeled). The composition and thicknesses of these layers allow exciting a confined optical mode on the upper interface (i.e., where microfluid 122 impinges on active sensing layer 124) with high intensity. The waveguides in the dielectric waveguide layer enable incident light used for sensing on the upper interface to have a high intensity with the sensed medium (i.e., microfluid 122). The optical guided modes are excited inside the waveguides and are engineered to have a large intensity at the analyte interface, having a long tail inside the analyte region. Thus the incident light is confined into small regions in the waveguides and as mentioned above, the waveguides are engineered such that the optical guided modes have an intense tail inside the medium to be sensed. This enhances the interaction of the guided modes with the medium to be sensed and consequently boosts the sensitivity of the active sensing layer to very small variations in the analyte. Thus the interaction between the guided mode and the medium to be sensed is very strong. The structure of these layers can confine the light energy of an incident beam of light 130 in a very narrow region in the interface space and therefore enhance light-matter interactions which significantly amplify molecular optical signatures. The thin metallic layer (not labeled) of active sensing layer 124 enables the tunneling of energy of the incident light into each waveguide and therefore the waveguides cannot be excited without the presence of the thin metallic layer. In addition, the presence of metal on one side of the waveguide and the analyte (i.e., microfluid 122) on the other side creates an asymmetric environment for the waveguide. Accordingly, this asymmetry enables a distinct distortion of the dispersion properties of the guided modes and forces them into the analyte region. Furthermore, this enables a large penetration depth of the guided modes inside the analyte. According to the disclosed technique, this asymmetry can account for the increased sensitivity obtainable by active sensing layer 124. In general, dispersion of optical modes is the most intrinsic fundamental physical property that determines all the features of the optical mode. With the aforementioned asymmetry, the dispersion of the guided modes enables a distortion causing a "hybrid" guided mode. Without the aforementioned asymmetry, having only a standard waveguide, a large interaction volume and sensitivity between the guided modes and the analyte region would not be obtained.

Microfluid 122 is injected into EV detection system 120 via the inlet and attaches to the upper surface of active sensing layer 124. EV detection system includes a microfluidic apparatus which can be fabricated by standard photolithography techniques. A microfluidic mold can be made of polydimethylsiloxane (herein abbreviated PDMS) with a depth of sub-millimeters having an integrated inlet and outlet. Incident beam of light 130 is collimated, via collimating optics 128, to the substrate layer (not labeled) of active sensing layer 124 which then travels through the dielectric waveguide layer (not labeled) of active sensing layer 124, thereby causing SPR of the EVs in microfluid 122. Guided optical modes in the dielectric waveguide layer (not labeled) of active sensing layer 124 are excited and are used for sensing EVs on the upper interface. The guided optical modes are then detected in a reflected beam of light 134 which is received via focusing optics 132 into a fiber probe (not shown). The spectrum of reflected beam of light 134 is recorded on a spectrophotometer (not shown) with maximum sensitivity in the working spectral region. The optical intensity reflected from the EVs and targets which adsorb on the active sensing layer structure is a function of wavelength. Upon adsorption of the target to an antibody on the upper layer of the active sensing layer, the optical intensity reflected from the specific region will change gradually which can be detected by a spectrophotometer. The reflected beam of light can be analyzed, as described below, for the presence of specific EVs which may be disease markers. As described below in FIG. 3, the upper surface of active sensing layer 124 can be functionalized with a suitable antibody to capture a relevant EV in different sensing regions.

It is noted that SPW can also be used to excite in the active sensing layer structure, however such waves will have an extremely low sensitivity to any variations in the medium to be sensed. This is because SPW will decay rapidly inside the waveguides and will not reach the analyte region. Even though according to the disclosed technique SPW is not used for sensing and therefore a thin metallic layer may seem unnecessary, the thin metallic layer of the active sensing layer is required in order to tunnel the energy of the incident light to the waveguides through the evanescent field that is generated inside the thin metallic layer.

According to the disclosed technique, microfluid 122 can be prepared as follows. First a microfluidic cover mold is made from a polymer, such as PDMS, which is a commercially available material that is cost effective and is commonly used for preparing microfluids having varying sizes from microns to millimeters. Other commercially available materials can also be used. Second, after preparing the microfluidic cover mold, both the microfluidic cover mold and the active sensing layer (i.e., the sensing element) are cleaned by a plasma treatment. A compact microwave generator with high intensity can be used to clean the mold and the sensing element after which adhesion of microfluid 122 is straightforward.

Figure 3:
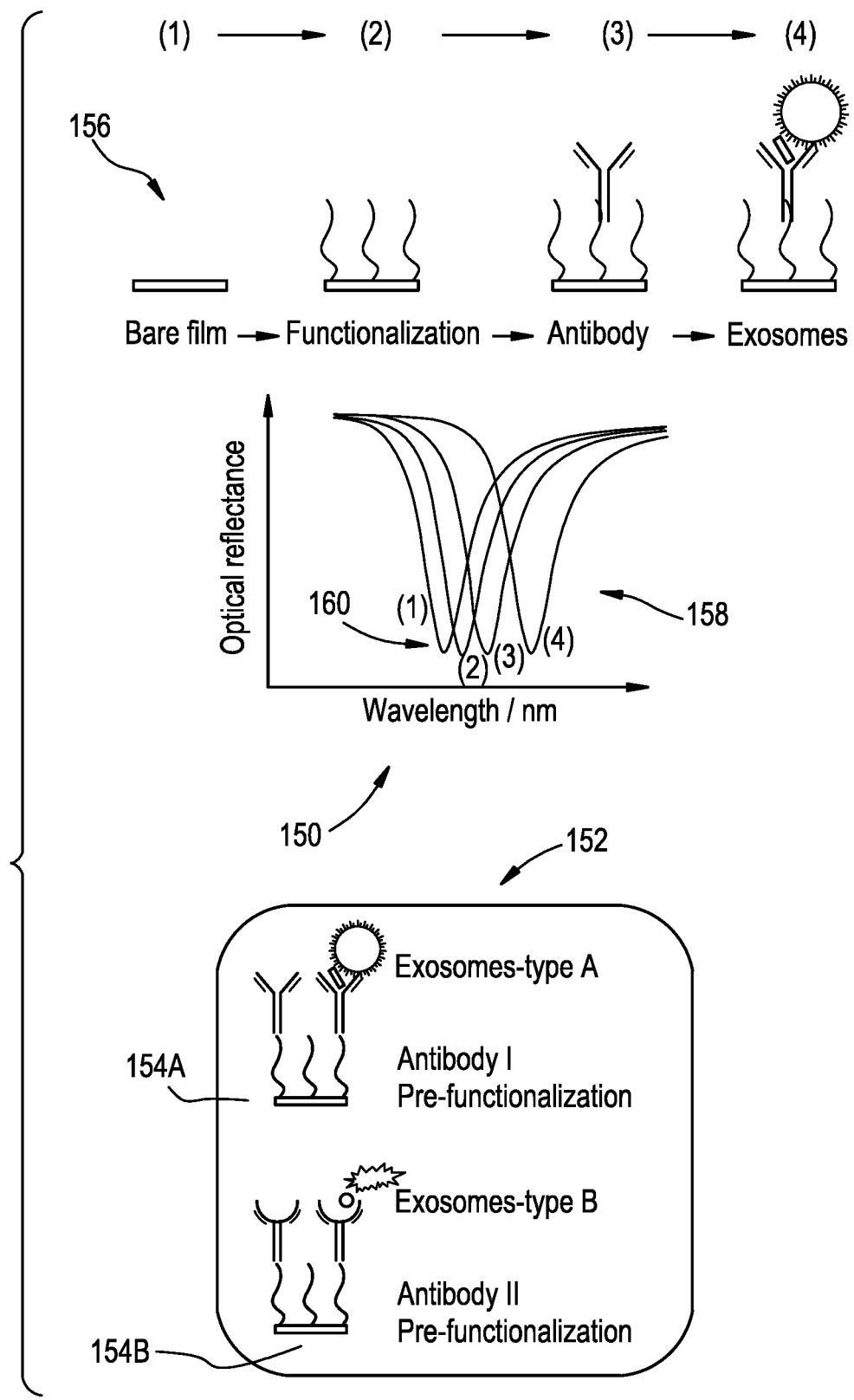
FIG. 3 is a schematic illustration showing the functionalization of an active sensing layer, constructed and operative in accordance with a further embodiment of the disclosed technique.

Reference is now made to FIG. 3, which is a schematic illustration showing the functionalization of an active sensing layer, generally referenced 150, constructed and operative in accordance with a further embodiment of the disclosed technique. A target is to concentrate the EVs and exosomes subject for detection on the interface of the active sensing element (as shown in FIG. 2) where the optical field intensity is largest. Since exosomes in general are characterized by protein-cargo on their membranes and inside the vesicles, a binding process of the exosomes in a microfluid sample can be executed using an appropriate antibody functionalization. A section 156 shows the various steps how an active sensing layer can be functionalized to a specific EV, for example a specific exosome. (1) shows the bare upper film, (2) shows the functionalization of the upper surface, (3) shows the coupling of a specific antibody to the functionalized upper surface and (4) shows a specific exosome coupled with the specific shown antibody. A section 152 shows how many sensing regions with different antibodies can be included in the active sensing layer to detect more than one target exosome. For example, a section 154A shows antibodies for a first kind of exosome and a section 154B shows antibodies for a second kind of exosome. As mentioned above, the system of the disclosed technique is based on plasmon-waveguide coupled resonance (herein abbreviated PWCR) to detect the presence of tumor traces in a microfluid sample and to distinguish between different types of tumors based on different types of exosomes. The hybrid modes of PWCR are coupled with pure highly sensitive plasmon modes to guided optical modes with high resolution. The outcome of this hybridization is plasmon-waveguide coupled (herein abbreviated PWC) modes with very high sensitivity and FOM. As shown in a graph 158, the optical reflectance as a function of wavelength changes depending on what is adsorbed on the surface of the bare film. These differences can be used to detect and recognize the presence of an exosome. In addition, different types of exosomes will have varying amounts of optical reflectance. A shown dip 160 in the reflection modes represents the existence of a leaky-guided mode on the interface between the upper interface of the active sensing layer and the sensing region which is the space just above the upper interface. Shifts in the resonance wavelength reflect change in the local density near the upper interface thereby correlating with the accumulation rates on the upper surface of the interface. Consequently, according to the disclosed technique, changes in the resonance wavelength can be used to quantify the variations in the exosome concentrations in the sensed region.

Referring back to FIG. 2, extracted bodily fluid from a patient is injected through a suitable microfluidic cavity (i.e., the inlet) that is attached on top of a sensing head (not labeled). The active region (active sensing layer 124) is composed of multiple layers in order to excite the required optical modes at the upper interface. The sensitivity of the optical modes to variations on the upper interface depends on the spectral region and the physical features of the EV structure. This sensitivity can be probed, as mentioned, using a broadband light source in the NIR region where the spectral signature of the reflected light correlates with the material adsorbed on the upper interface. These modes are very sensitive to small variation in the medium close to the interface. Therefore, once the target molecule from flowing microfluid 122 is adsorbed to a specific region on the sensor surface, the optical reflectance will substantially change and can be recorded via reflected beam 134 on a spectrometer (not shown) in the output optical path. In order to increase the throughput of the EV detection system 120, multiple regions on the upper surface of the active region are functionalized with different antibodies and thus more than one EV target can be simultaneously detected according to the disclosed technique.

Incident beam of light 130 emerges from a broadband source (not shown) that covers the working spectral region. The broadband source can be a white light source with low intensity thereby not deteriorating the tested sample of microfluid and not limiting the user. As mentioned above, the detection mechanism is based on a weak probing of the reflected beam spectrum. As shown in graph 158 (FIG. 3), a distinct dip in the spectrum is obtained for the bare structure, reflecting the excitation of an optical guided mode in the dielectric waveguide. The successive adsorption of the antibody and the target EV entities subject for sensing will shift the dip, which can be detected by a standard spectrophotometer.

It is noted that unlike the prior art, the configuration of the disclosed technique does not make use of functionalized magnetic beads, electrochemical schemes, optical coherence tomography two photon luminescence or conventional fluorescence techniques for the detection of exosomes. In addition, the detection scheme of the disclosed technique as described above relates to surface plasmon waves and surface plasmon resonance and does not relate to surface enhanced Raman scattering (herein abbreviated SERS). Furthermore, the disclosed technique does not make use of nanoparticle arrays nor functionalized nanoparticles with supramolecular sequences for the detection of biomarkers. It is noted that nanoparticle arrays are substrates that require sophisticated fabrication techniques such as focused ion beam (herein abbreviated FIB) systems or electron beam lithography means. Both these fabrication techniques require expensive and large scale facilities and involve a milling process that requires time, expertise and accuracy. As mentioned above, the active sensing element of the disclosed technique is composed of a number of two-dimensional (herein abbreviated 2D) layers not requiring any patterning. The metal layer in the active sensing element is very thin and can be prepared by sputtering with high quality which is a process that takes a number of minutes to fabricate.

As mentioned above, the disclosed technique enables a high level of sensitivity and detection resolution above the prior art. Whereas prior art systems detect shifts in wavelength, the disclosed technique detects shifts in optical intensity. The resolution in prior art systems for the detection of shifts in wavelength is in the range of nanometers when the sensing element is functionalized with specific antibodies. According to the disclosed technique, shifts in optical intensity can be detected in the range of nanometers when the sensing element is not functionalized with specific antibodies. In the case of the sensing element (the active layer structure) being functionalized with specific antibodies, shifts in optical intensity should be able to be detected in the sub-nanometer range, thereby increasing the detection resolution of the disclosed technique by an order of magnitude over the prior art.

Also as mentioned above, the disclosed technique provides for a cost effective EV detector which is inexpensive to fabricate and operate. Prior art systems for detecting EVs which use nanoparticle arrays (e.g., hole-arrays) need to measure the optical density of an optical beam that emerges from the array in a transmission mode. Such detection requires the use of a cooled CCD spectrometer. Such systems are expensive and also need to be cooled to suppress or lower any possible thermal noise during use, which can be significant when the optical signal is very weak. In the disclosed technique, reflectivity of an incident beam of light is measured from a 2D active sensing element thereby leading to a signal that is averaged over an entire area of a sensed region. In order to measure such a reflectivity all that is needed is a regular spectrometer in the visible or NIR regions, or in the EM spectrum, which significantly simplifies the measuring system as compared to a cooled CCD spectrometer.

It is noted that SPR sensors as biological sensors are known in the art. According to the disclosed technique, an SPR sensor is provided having increased sensitivity by at least one to two orders of magnitude thereby enabling the detection of EVs such as microvesicles and exosomes. The increased sensitivity is achieved according to a coupling between a thin metal layer combined with a dielectric layer, for example made from a polymer. This was shown above in FIG. 1. Both the thin metal layer and the dielectric layer have waveguides for generating optical guided modes from the incident light onto an analyte (i.e., a microfluid sample containing EVs) and receiving a reflection. As mentioned above, the mode that is used for sensing the analyte is the guided mode inside the dielectric waveguides. SPW is only used to facilitate the excitation of the guided modes and to enable control of their sensitivity on the analyte.

The disclosed technique has been described as a system and method for measuring changes in wavelength based on differences in reflectance which comes about through surface plasmon resonance coupled to highly-sensitive optical guided modes. However the disclosed technique can also be embodied via a system and method for measuring changes in intensity as an indication of the presence of an exosome. Said otherwise, the sensitivity of the system of the disclosed technique can be embodied as a measure of minute changes in intensity of the analyte (i.e., the microfluid sample containing the EVs). Such a system is similar to the EV detection system shown above in FIG. 2 however instead of measuring reflectance, intensity of the reflected beam is the measured quantity for detecting the presence of specific exosomes and EVs. Using intensity as a measure of exosome presence might produce an even higher resolution than using reflectance and SPR. In such an embodiment, the light source would be a coherent light source in the very NIR region, for example a laser diode having an operational wavelength of 785 nanometers. The light source could also operate at other wavelengths according to the required sensitivity and detection dynamic range. This embodiment is explained in greater detail below in reference to FIG. 7.

Figure 4:
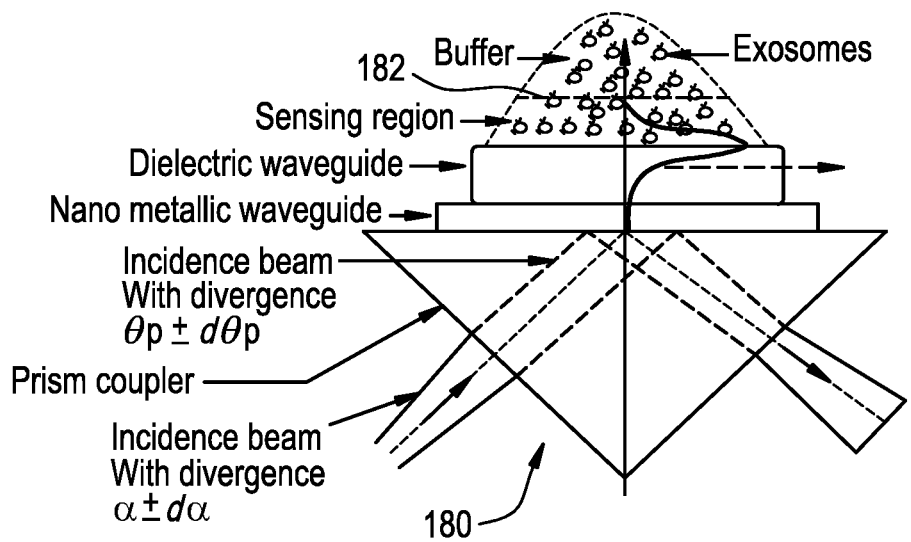
FIG. 4 is a schematic illustration of another EV detection system, constructed and operative in accordance with another embodiment of the disclosed technique.
Figure 4:
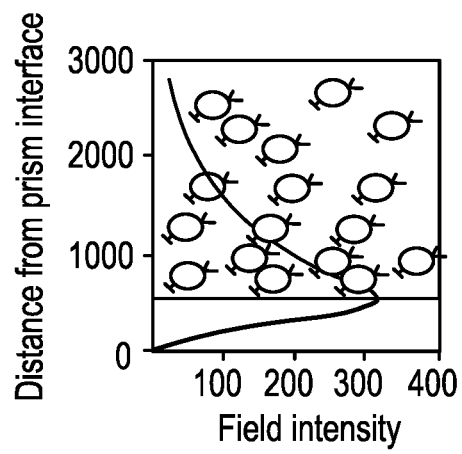
Figure 4:
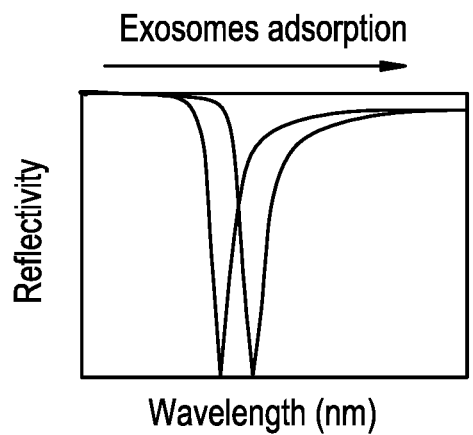

Reference is now made to FIG. 4, which is a schematic illustration of another EV detection system, generally referenced 180, constructed and operative in accordance with another embodiment of the disclosed technique. EV detection system 180 is similar to EV detection system 120 (FIG. 2) however the detection system in FIG. 4 shows the sensing region, delineated by a dotted line 182, wherein reflectance from resonance with exosomes in the sensing region can be detected. The penetration depth of the electromagnetic intensity inside the sensing medium determines the sensing range. The penetration depth of the field as shown in FIG. 4 is on the order of 2 microns, thus in the example of the system shown, about 2% of the exosomes per unit area interacts with the incident beam of light. In addition, in the given example, the percent weight of the exosomes in the buffer is about $10^{-4}$. With a spectrometer having a spectral resolution of approximately 3 nanometers, the lowest detection limit of EV detection system 180 can be estimated as reaching $1.6 \times 10^{-5}$ percent weight.

Figure 5:
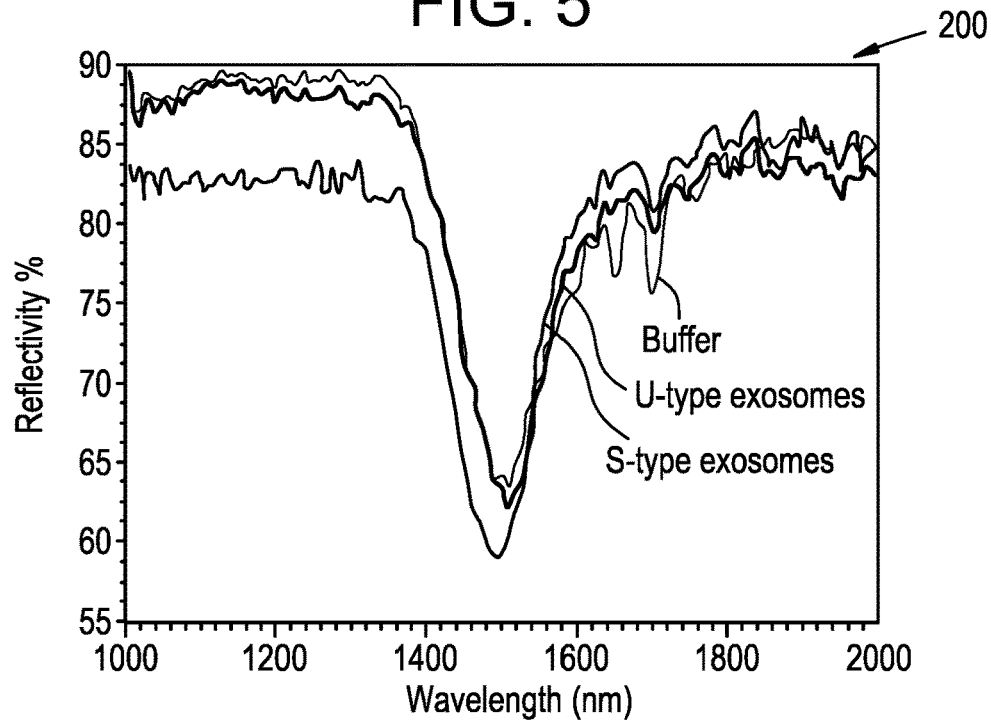
FIG. 5 is a graph showing a shift in the spectral profile of transverse electric-polarized guided modes due to exosomes of types U and S, constructed and operative in accordance with a further embodiment of the disclosed technique.

Reference is now made to FIG. 5, which is a graph showing a shift in the spectral profile of TE-polarized guided modes due to exosomes of types U and S, generally referenced 200, constructed and operative in accordance with a further embodiment of the disclosed technique. Graph 200 shows the reflectivity spectrum of U (i.e., urine-derive exosomes) and S (i.e., serum-derived exosomes) with respect to a reference measure only from the buffer medium. The shallow and broad dips originate from an incidence angle divergence effect. As shown, a distinct shift in the spectral profile of the TE-polarized guided modes due to exosomes of types U and S is clearly visible and achieved using the EV detection system of the disclosed technique. It is noted that in this embodiment, the presence of exosomes in a bulk medium can be detected without any functionalization of the sensing element with antibodies (as opposed to what was shown above in FIG. 3).

Figure 6:
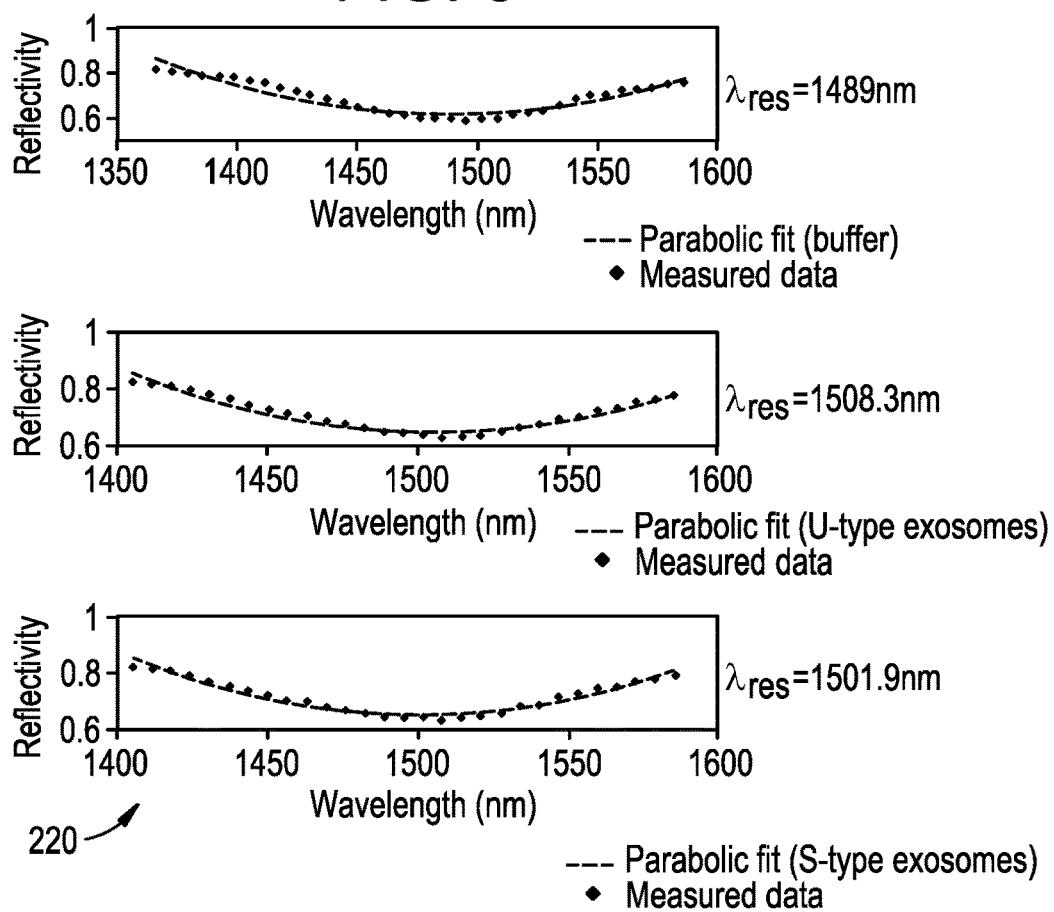
FIG. 6 is a set of graphs showing reflectivity of the transverse electric-polarized guided modes of FIG. 5 in the vicinity of the resonance region fitted to a second-order polynomial profile, constructed and operative in accordance with another embodiment of the disclosed technique.

Reference is now made to FIG. 6, which is a set of graphs showing reflectivity of the TE-polarized guided modes of FIG. 5 in the vicinity of the resonance region fitted to a second-order polynomial profile, generally referenced 220, constructed and operative in accordance with another embodiment of the disclosed technique. To determine the resonance wavelengths and the relative shifts, the reflectivity in the vicinity of the resonance region was fitted to a second-order polynomial profile. The resonance wavelength of the reference buffer, U-type exosomes and S-type exosomes were 1489 nanometers, 1508 nanometers and 1501.3 nanometers respectively. These resonance wavelengths yield shifts of 19 nanometers for U-type exosomes and 12.9 nanometers for S-type exosomes.

According to the disclosed technique coupled plasmon-waveguide optical modes can be used to detect exosomes with a sensitivity of at least $10^{-4}$ percent weight in a bulk medium, which is at least one order of magnitude higher in sensitivity than the sensitivity reported by the prior art. Furthermore, the EV detection system of the disclosed technique can not only detect the presence of exosomes with high sensitivity but can also distinguish between different exosomes from different sources. As mentioned above, the disclosed technique can be used to detect exosomes and other EVs as biomarkers to detect the presence of cancers and other diseases of the body that exhibit a specific and unique exosome and/or EV signature.

Figure 7:
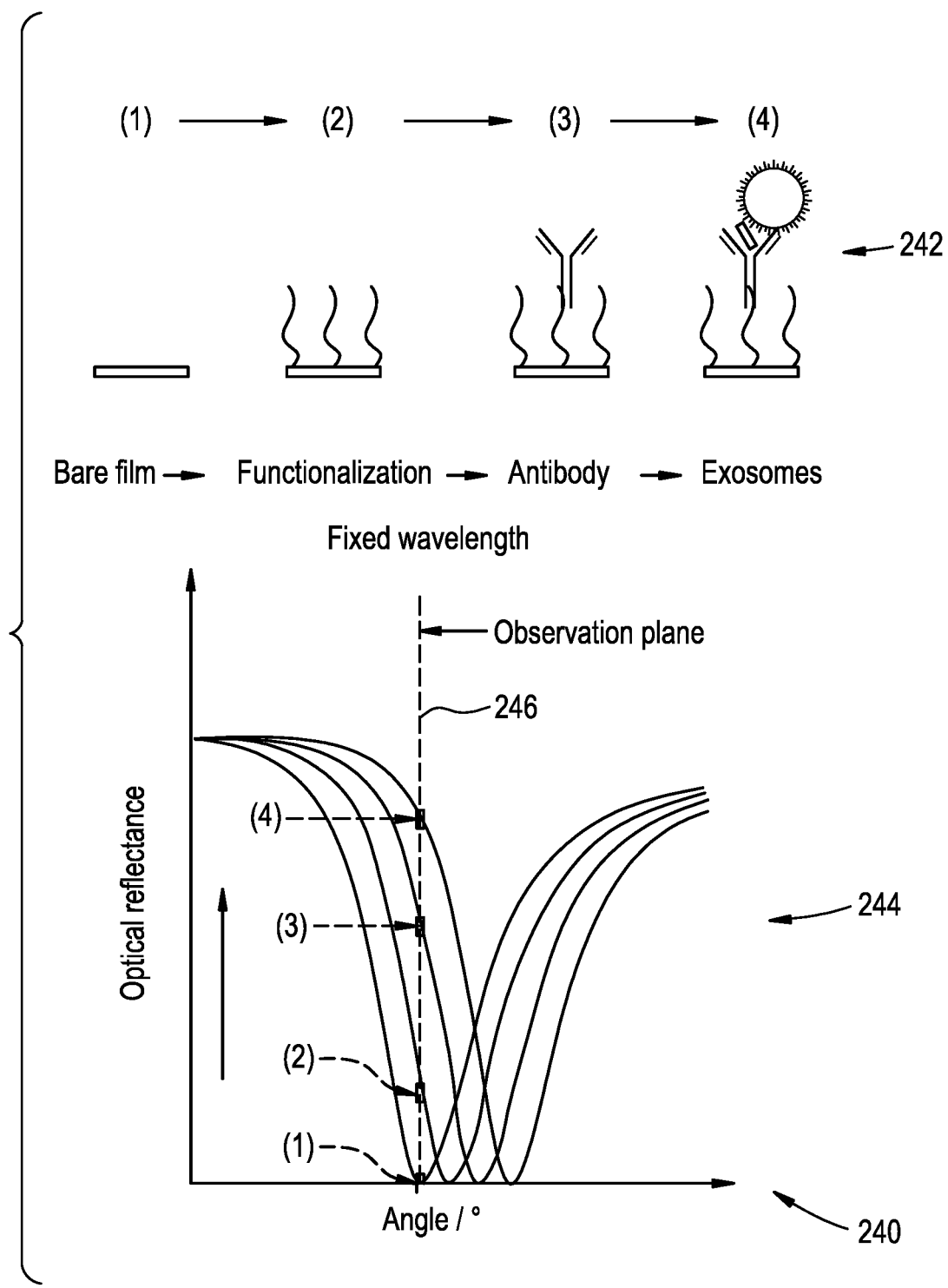
FIG. 7 is a schematic illustration showing the functionalization of an active sensing layer using an angular interrogation mode, constructed and operative in accordance with a further embodiment of the disclosed technique.

Reference is now made to FIG. 7, which is a schematic illustration showing the functionalization of an active sensing layer using an angular interrogation mode, generally referenced 240, constructed and operative in accordance with a further embodiment of the disclosed technique. A section 242 shows the functionalization steps as described above in section 156 (FIG. 3). A graph 244 shows the optical response along the functionalization process showing the shift in the resonance angle upon the adsorption of exosomes. This is illustrated on a line 246. In this embodiment, the presence of exosomes is sensed by using an optical detector positioned at a fixed angle to the EV detection system (not shown) which tracks changes in the intensity of the reflected light. In particular, the optical detector may have a fixed angle in relation to the coupler (not shown) of the EV detection system. The numbers on the curves in graph 244 represent the optical intensity that is acquired at each of the functionalization steps. The calibration of the reflected intensity as a function of the coupling of the target exosomes sets the sensing mechanism.

In this embodiment of the disclosed technique, the incident wavelength is fixed and the reflectivity of the incident light versus the incident angle is scanned and measured. At the resonance angle, there should be a dip in the reflectivity, which is also sensitive to the presence of the target exosomes on the interface surface. In this embodiment, the detector is fixed at a given angle and detection is achieved according to intensity changes as a function of adsorption of the analyte. In this embodiment, there is no need for a spectrometer and a single detector can be used that only needs to measure the intensity of the reflected light at a given wavelength. The observation plane represents the angle at which the detector is set and can be optimized for maximum sensitivity.

It will be appreciated by persons skilled in the art that the disclosed technique is not limited to what has been particularly shown and described hereinabove. Rather the scope of the disclosed technique is defined only by the claims, which follow.

The invention claimed is:

1. Method for preparing an active sensing element for use in a surface plasmon coupled wavelength detection system for detecting at least one extracellular vesicle in a microfluid, comprising procedures of cleaning a glass substrate; depositing a thin metallic layer on said glass substrate; dissolving a polymer in an appropriate solvent to form a polymer solution to prepare a dielectric waveguide layer; applying said polymer solution to the top of said thin metallic layer; and annealing said active sensing element, thereby chemically stabilizing said dielectric waveguide layer, wherein said procedure of dissolving comprising a sub-procedure of adjusting a thickness of said dielectric waveguide layer by modifying a viscosity of said polymer solution.

2. The method according to 1, wherein said procedure of depositing is executed using a procedure selected from a list consisting of:
   sputtering; and
   thermal evaporation under high vacuum.

3. The method according to 1, said procedure of applying comprising a subprocedure of fine-tuning a thickness of said dielectric waveguide layer using a technique of spin coating.

4. The method according to 1, wherein said procedure of annealing is executed using an oven with a temperature ranging from 100-120 degrees Celsius.

\* \* \* \* \*